United States Patent
Lee et al.

(10) Patent No.: US 8,144,782 B2
(45) Date of Patent: *Mar. 27, 2012

(54) ADAPTIVE MOTION ESTIMATION/COMPENSATION DEVICE FOR MB/BASED ILLUMINATION CHANGE AND METHOD THEREOF

(75) Inventors: Yung-Lyul Lee, Seoul (KR); Chung-Ku Lee, Incheon (KR)

(73) Assignee: Humax Co., Ltd., Seongnam-Si (KR)

( * ) Notice: Subject to any disclaimer, the term of this patent is extended or adjusted under 35 U.S.C. 154(b) by 884 days.

This patent is subject to a terminal disclaimer.

(21) Appl. No.: 12/160,566

(22) PCT Filed: Dec. 28, 2006

(86) PCT No.: PCT/KR2006/005843
§ 371 (c)(1), (2), (4) Date: Aug. 25, 2008

(87) PCT Pub. No.: WO2007/081104
PCT Pub. Date: Jul. 19, 2007

(65) Prior Publication Data
US 2008/0317131 A1    Dec. 25, 2008

(30) Foreign Application Priority Data
Jan. 12, 2006 (KR) .................. 10-2006-0003666

(51) Int. Cl.
H04N 7/12 (2006.01)
H04N 11/02 (2006.01)
H04N 11/04 (2006.01)

(52) U.S. Cl. ................................. 375/240.16

(58) Field of Classification Search ............. 375/240.16
See application file for complete search history.

(56) References Cited

U.S. PATENT DOCUMENTS

| | | | |
|---|---|---|---|
| 6,671,319 B1 * | 12/2003 | Chang et al. ............. | 375/240.16 |
| 6,879,633 B2 | 4/2005 | Prakash et al. | |
| 6,914,938 B2 | 7/2005 | Zhang et al. | |
| 7,924,923 B2 * | 4/2011 | Lee et al. ................. | 375/240.16 |
| 2003/0072374 A1 * | 4/2003 | Sohm ....................... | 375/240.16 |

* cited by examiner

*Primary Examiner* — Xavier Szewai Wong
(74) *Attorney, Agent, or Firm* — Birch, Stewart, Kolasch & Birch, LLP (57) ABSTRACT

An adaptive motion estimation/compensation device and a method thereof for MB-based illumination change are disclosed. If a macro block mode is determined as a newly designed P_L0_16×16_Mean by calculating the sum of an absolute difference, the motion estimation device CABAC-codes the absolute difference between the pixel mean of a current frame and the pixel mean of a candidate pattern block and transmits the CABAC-coded absolute difference to a pertinent decoder. With the present invention, the transmission amount of the bit stream transmitted to the decoder for decoding can be minimized by maximizing corresponding compressing rate.

15 Claims, 6 Drawing Sheets

| Slice type | Value(name) of mb_type | Bin string | | | | | |
|---|---|---|---|---|---|---|---|
| P,SP slice | 0 (P_L0_16x16) | 0 | 0 | 0 | | | |
| | 1 (P_L0_L0_16x8) | 0 | 1 | 1 | | | |
| | 2 (P_L0_L0_8x16) | 0 | 1 | 0 | 1 | | |
| | 3 (P_8x8) | 0 | 0 | 1 | 0 | | |
| | 4 (P_8x8ref0) | na | | | | | |
| | 5 to 30 (Intra, prefix only) | 1 | | | | | |
| | 31 (P_L0_16x16_Mean) | 0 | 0 | 1 | | | |

FIG. 5

| Abs. value | Bin string |
|---|---|
| | *EG0* suffix |
| 0 | 0 |
| 1 | 100 |
| 2 | 101 |
| 3 | 11000 |
| 4 | 11001 |
| 5 | 11010 |
| 6 | 11011 |
| 7 | 1110000 |
| 8 | 1110001 |
| ⋮ | ⋮ |

FIG. 6

ADAPTIVE MOTION ESTIMATION/COMPENSATION DEVICE FOR MB/BASED ILLUMINATION CHANGE AND METHOD THEREOF

TECHNICAL FIELD

The present invention is related to motion estimate (ME) and motion compensation (MC), more specifically to an adaptive motion estimation/compensation device and a method thereof for MB-based illumination change.

BACKGROUND ART

ITU-T and ISO/IEC has developed H.264 (MPEG-4 part 10 advanced video coding), which can reduce a lot of bits, to increase the video coding efficiency. For the reference, H.264 uses spatial prediction coding method unlike a conventional video coding standard such as MPEG-1, MPEG-2, and MPEG-4 part 2 visual. The conventional method uses the intra prediction of coefficients converted in the DCT transform domain to increase the coding efficiency. As a result, the conventional method causes generating the subjective image deterioration of the range of low transmission bit-rate. However, the H.264 employs the spatial intra prediction coding method at the spatial domain instead of the transform domain.

As such, the development of the video coding standard brings about a lot of studies on a block matching motion estimation (BMME). Most methods for the BM calculates the sum of absolute differences (SAD) between the block of a current frame and the candidate block of a reference block and determines the position of the candidate block having the smallest SAD as a motion vector of the current frame block.

Residuals between the candidate block and the current frame undergoes the discrete cosine transform (DCT) and the quantization. Then, the residuals undergoes the variable length coding (VLC) along with the motion vector. Here, since finding the motion vector refers to acquiring the motion vector removed with the temporal redundancy of the current frame and the reference frame, the coding efficiency can be considerably increased. However, this process has the following problems.

During the multi-view video coding process, in case that the illumination is changed between inter-views inputted through different cameras in the same time axis or same-views inputted through the same camera in a successive time axis (e.g. scene is changed, or the illumination becomes darker or twinkles in an image), the prior art calculates an SAD between each block and finds the minimum SAD to perform the coding of pertinent residuals. A lot of bits used for the coding are requested, to thereby lower the compressing rate rapidly.

Typically, if there is a scene change, a corresponding intra-frame coding for the changed frame is more efficient than the motion estimate (ME) and motion compensation (MC). This is because the pattern of a current frame block is not found in any area of the searching domain of the reference frame. Similarly, the illumination change or twinkling also takes the same result for the aforementioned process of the ME and the coding of pertinent residuals. Accordingly, the intra-frame coding is mostly applied. In this case, since there was no scene change, a block having the similar pattern to the current frame block can be found. However, even though the residuals of the block and the current frame block are coded, a lot of bits are requested.

DISCLOSURE

Technical Problem

Accordingly, the present invention, which is designed to solve the aforementioned problems, provides an adaptive motion estimation/compensation device and a method thereof for MB-based illumination change that can more efficiently code and decode an image through adaptive motion estimation (ME) and motion compensation (MC) for illumination change.

Also, the present invention provides an adaptive motion estimation/compensation device and a method thereof for the illumination change that can minimize the transmission amount of the bit stream transmitted to a decoder for decoding by transforming the binarization of the MB type of the P slice of H.265 a little and attempting to maximize compressing rate applied with various SAD calculating formulas in the case of a 16×16 block for example.

In addition, the present invention provides a codec that is little affected by a change of surrounding illumination in an actual environment.

Other problems that the present invention solves will become more apparent through the following description.

Technical Solution

To solve the above problems, an aspect of the present invention features adaptive motion estimation method for illumination change and a recorded medium recording a program for executing the method thereof According to an embodiment of the present invention, the motion estimation method can include generating the current frame pattern block of a current frame block and the reference frame pattern block of a reference frame block; calculating the SAD of candidate pattern blocks corresponding to the current frame pattern block among the reference frame pattern blocks and determining a candidate pattern block corresponding to the SAD that meets to predetermined condition among the calculated SADs as a macro block mode and a motion vector; using a candidate pattern block corresponding to the motion vector and a different signal of the current frame pattern block, performing the discrete cosine transform (DCT) and the quantization of the residual signal in accordance with a predetermined coding mode, and coding the current frame block; and attaching sign information and coded absolute difference to header information corresponding to the coded current frame block if the macro block mode can includes a 16×16 size. Here, the coding information can refer to a sign of the difference between the pixel mean of the current frame block and the pixel mean of the reference frame block, and the absolute difference refers to the absolute difference between the pixel mean of the current frame block and the pixel mean of the reference frame block.

The current frame block can include at least one of 16×16, 16×8, 8×16, 8×8, 8×4, 4×8, and 4×4 size types.

The step of generating the current frame pattern block of the current frame block and the reference frame pattern block of the reference frame block can include calculating the luminance component mean of the current frame block and the luminance component mean of the reference frame block; and generating the current frame pattern block by subtracting the luminance component mean of the current frame block from the luminance component of the current frame block and generating the reference frame pattern block by subtracting the luminance component mean of the reference frame block from the luminance component of the reference frame block.

The absolute difference can be coded by a context adaptive binary arithmetic coding (CABAC) method, a corresponding size can be represented by binary coding symbol (ABS), and the size can be coded by the $0^{th}$ power of exp-golomb code (EGC). The sign information can be represented by 1-bit sign.

In the step of calculating the SAD of the candidate pattern blocks and determining the candidate pattern block as a macro block mode and a motion vector, the candidate pattern block can includes 16×16, 16×8, 8×16 and 8×8 size types, each SAD for all candidate pattern blocks is calculated by the formula 1 of $$SAD(x, y) = \sum_{i=0}^{S-1} \sum_{j=0}^{T-1} |f(i, j) - r(i+x, j+y)|,$$

and the SAD for the candidate pattern block having the 16×16 size type is further calculated by the formula 2 of $$NewSAD(x, y) = \sum_{i=0}^{15} \sum_{j=0}^{15} |[f(i, j) - M_{curr}] - [r(i+x, j+y) - M_{ref}]|,$$

where f(i, j) is the pixel value of the spatial coordinate (i, j) of the current frame, r(i+x,j+y) is the pixel value of the spatial coordinate (i+x, j+y) of the reference frame, S and T refer to each size of blocks used in a block matching process, (x,y) refers to the motion vector, Mcurr refers to the pixel mean of the current block, and Mref refers to the pixel mean of the candidate block of the reference frame.

The step of attaching the sign information and coded absolute difference to the header information corresponding to the coded current frame block can be performed if the SAD calculated by the formula 2 is the minimum SAD.

The residual signal is calculated by the following formula:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR refers to the residual signal subtracting each pixel mean, Mcurr refers to the pixel mean of the current block, Mref refers to the pixel mean of the candidate block of the reference frame, f(i, j) is the pixel value of the spatial coordinate (i, j) of the current frame, r(i, j) is the pixel value of the spatial coordinate (i, j) of the reference frame and (x,y) refers to the motion vector.

To solve the above problems, another aspect of the present invention features adaptive motion estimation device.

According to an embodiment of the present invention, the adaptive motion estimation device can include a pattern block generating unit, generating the current frame pattern block of a current frame block and the reference frame pattern block of a reference frame block; a motion vector determining unit, calculating the SAD of candidate pattern blocks corresponding to the current frame pattern block among the reference frame pattern blocks and determining a candidate pattern block corresponding to the SAD that meets to predetermined condition among the calculated SADs as a macro block mode and a motion vector; a motion compensation unit, generating a residual signal by using a candidate pattern block corresponding to the motion vector and a different signal of the current frame pattern block, performing the discrete cosine transform (DCT) and the quantization of the residual signal in accordance with a predetermined coding mode, and coding the current frame block; and a header information attaching unit, attaching sign information and coded absolute difference to header information corresponding to the coded current frame block if the macro block mode can includes a 16×16 size. Here, the coding information can refer to a sign of the difference between the pixel mean of the current frame block and the pixel mean of the reference frame block, and the absolute difference refers to the absolute difference between the pixel mean of the current frame block and the pixel mean of the reference frame block.

The absolute difference can be coded by a context adaptive binary arithmetic coding (CABAC) method, a corresponding size can be represented by binary coding symbol (ABS), and the size can be coded by the $0^{th}$ power of exp-golomb code (EGC). The sign information can be represented by 1-bit sign.

The pattern block generating unit can calculate the luminance component mean of the current frame block and the luminance component mean of the reference frame block, generate the current frame pattern block by subtracting the luminance component mean of the current frame block from the luminance component of the current frame block and generate the reference frame pattern block by subtracting the luminance component mean of the reference frame block from the luminance component of the reference frame block.

The device can i further include means performing the discrete cosine transform and the quantization of the residual signal.

In the step of calculating the SAD of the candidate pattern blocks and determining the candidate pattern block as a macro block mode and a motion vector, the candidate pattern block can includes 16×16, 16×8, 8×16 and 8×8 size types, each SAD for all candidate pattern blocks is calculated by the formula 1 of $$SAD(x, y) = \sum_{i=0}^{S-1} \sum_{j=0}^{T-1} |f(i, j) - r(i+x, j+y)|,$$

and the SAD for the candidate pattern block having the 16×16 size type is further calculated by the formula 2 of $$NewSAD(x, y) = \sum_{i=0}^{15} \sum_{j=0}^{15} |[f(i, j) - M_{curr}] - [r(i+x, j+y) - M_{ref}]|,$$

where f(i, j) is the pixel value of the spatial coordinate (i, j) of the current frame, r(i+x,j+y) is the pixel value of the spatial coordinate (i+x, j+y) of the reference frame, S and T refer to each size of blocks used in a block matching process, (x,y) refers to the motion vector, Mcurr refers to the pixel mean of the current block, and Mref refers to the pixel mean of the candidate block of the reference frame The residual signal is calculated by the following formula:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR refers to the residual signal subtracting each pixel mean, Mcurr refers to the pixel mean of the current block, Mref refers to the pixel mean of the candidate block of the reference frame, f(i, j) is the pixel value of the spatial coordinate (i, j) of the current frame, r(i, j) is the pixel value of the spatial coordinate (i, j) of the reference frame and (x,y) refers to the motion vector.

MODE FOR INVENTION

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element Can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 1:
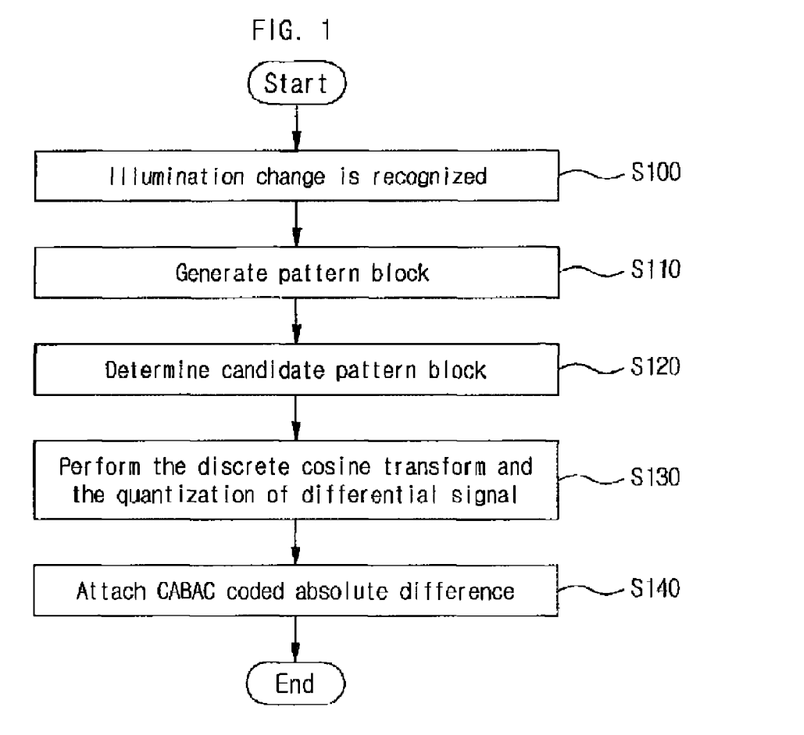
FIG. 1 is a flow chart illustrating the operation sequence of an adaptive motion estimate method in accordance with an embodiment of the present invention.

FIG. 1 is a flow chart illustrating the operation sequence of an adaptive motion estimate method in accordance with an embodiment of the present invention.

If the illumination is changed or twinkles in an image, the adaptive motion estimate (ME) method of the present invention recognizes the change or the twinkle. Then, the adaptive ME method is configured to search a code a block having most similar pattern instead of the intra-frame coding.

In other words, considering that the illumination gets the luminance (Y) component value of a pertinent block wholly to be increased, the present invention calculates the average of the luminance component of the current block and generates a new pattern block by calculating the difference between each component value and the calculated average value. For reference frame, the same process generates a reference pattern block.

The present invention is a method that performs the ME between the current pattern block and the reference block, generated by the aforementioned method, before performing the pertinent coding.

Hereinafter, the operation sequence in accordance with the present invention will be described with reference to FIG. 1.

In a step represented by S100, if the illumination change such as twinkle is generated, the change is recognized. Then, the coding in accordance with the motion estimate (ME) of the present invention is performed instead of the typical intra-frame coding.

In a step represented by S110, to search a candidate block having a most similar pattern to the current frame among the reference frame blocks, the pattern block of the current frame block is generated by calculating the average of the luminance (Y) competence of the current frame and subtracting the average value from each luminance component. For reference frame blocks, the same process generates the pattern block of the reference frame block.

If all pattern blocks of the current frame block and the reference block are completed, in a step represented by S120, the SAD between the pattern blocks is calculated. Then, the candidate block having the minimum SAD value is determined as a macro block mode and or a final motion vector. The formula of calculating the SAD can be differently determined depending on each macro block type. This will be described below with reference to the pertinent drawings.

Then, to increase the coding efficiency, the above-calculated pattern block is used. In other words, in a step represented by S130, the difference signal (hereinafter, referred to as residual signal), between the pattern blocks of the candidate block, appointed by the final motion vector, and the pattern block of the current flame block, undergoes the discrete cosine transform and the quantization. Accordingly, the corresponding coding can be performed with use of less numbers of bits. Here, in case that the macro block mode is determined as a macro block type 311, the absolute difference between a first pixel mean Mcurr and a second pixel mean can be coded along with the above coding. The first pixel mean Mcurr refers to the average value of the luminance component in the current frame block, and the second pixel mean Mref refers to the average value of the luminance component in the candidate block of the reference frame. Here, the coding method can be a CABAC coding method. Alternatively, the entire other coding methods, which is able to increase the compressing rate, can applied to the present invention without any restriction.

In a step represented by S140, the coded absolute difference can be attached and transmitted to a decoding device for decoding.

Since the blocks, which must undergo the intra-frame coding according to the conventional art, are coded through the motion estimate according to the present invention, the coding efficiency can be increased.

Hereinafter, a detailed method for coding and decoding in accordance with the present invention will be described with reference to FIG. 2 through FIG. 6.

Figure 2:
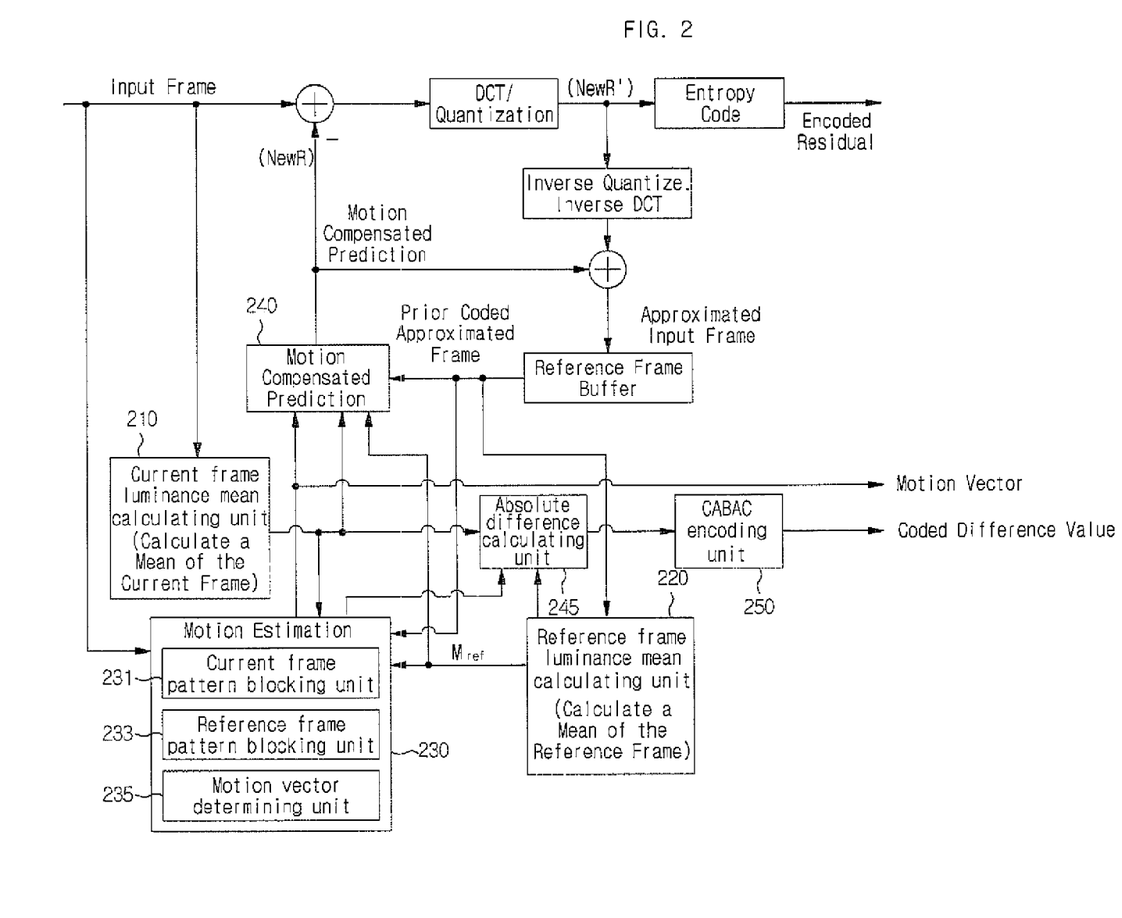
FIG. 2 is a block diagram illustrating the structure of a coding device in accordance with an embodiment of the present invention.
Figure 3:
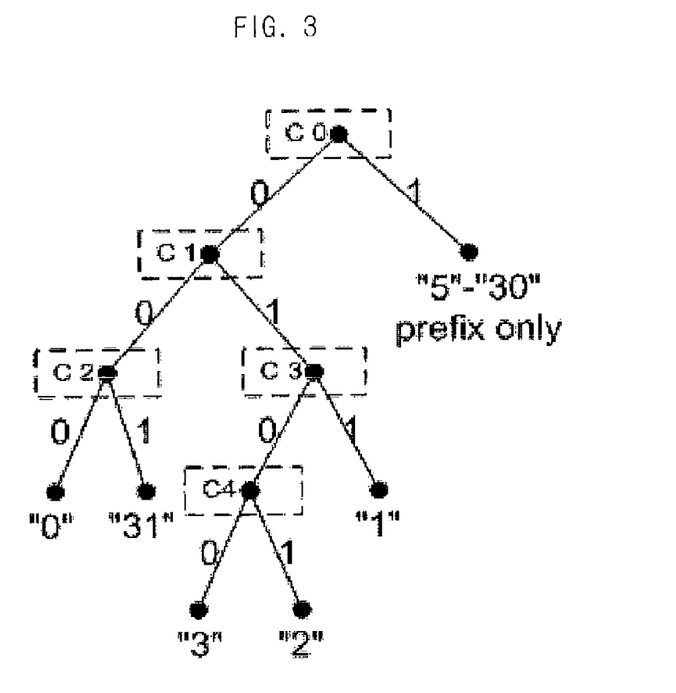
FIG. 3 illustrates a binarization coding tree related to a binarization schema in accordance with an embodiment of the present invention.
Figure 4:
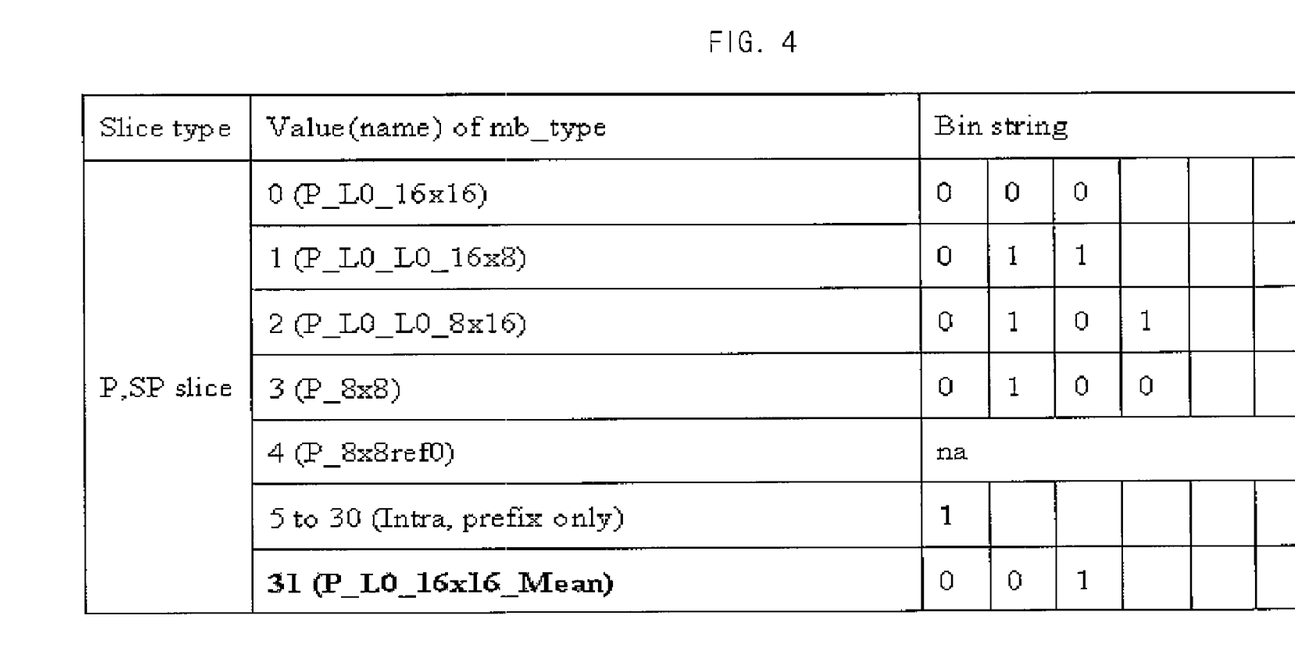
FIG. 4 illustrates the binarization related to the macro block type of a P slice in accordance with an embodiment of the present invention.
Figure 5:
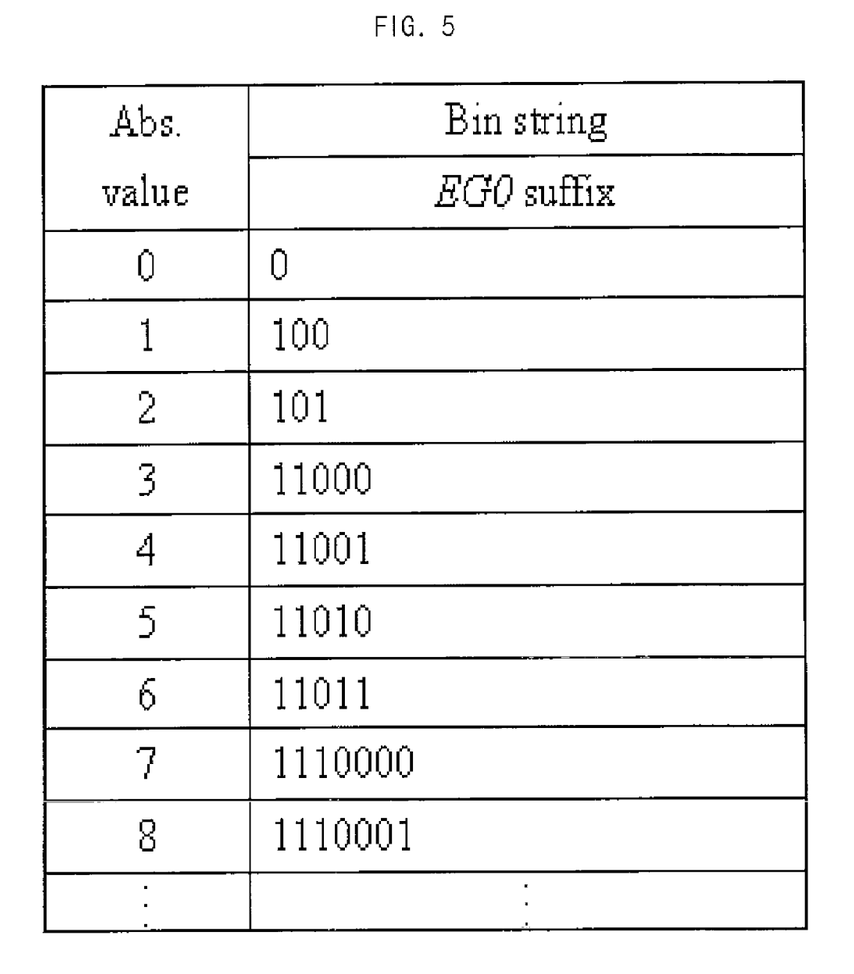
FIG. 5 illustrates the binarization of an absolute difference in accordance with an embodiment of the present invention.
Figure 6:
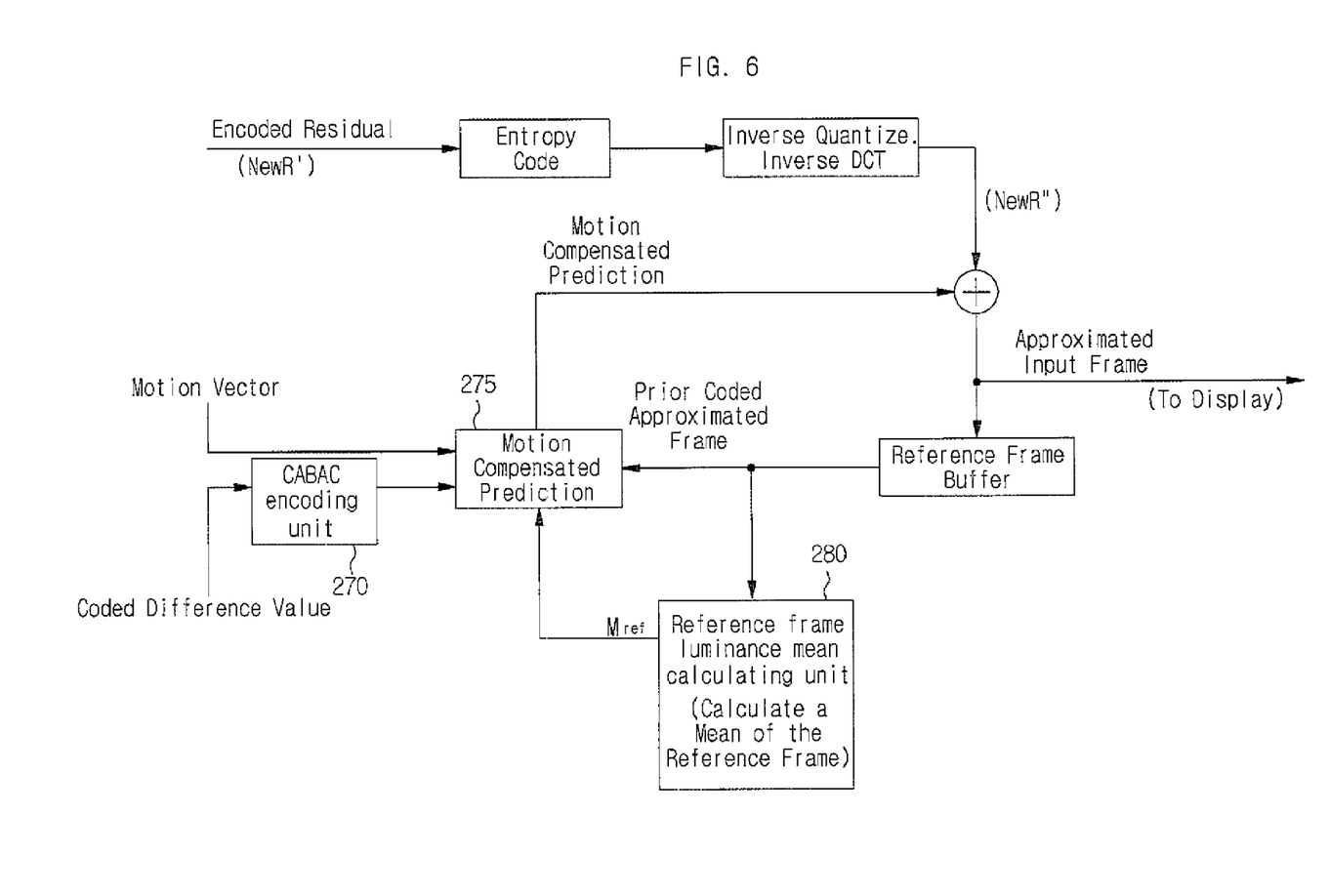
FIG. 6 is a block diagram illustrating the structure of a decoding device in accordance with an embodiment of the present invention.

FIG. 2 is a block diagram illustrating the structure of a coding device in accordance with an embodiment of the present invention, FIG. 3 illustrates a binarization coding tree related to a binarization schema in accordance with the embodiment of the present invention, FIG. 4 illustrates the binarization related to the macro block type of a P slice in accordance with the embodiment of the present invention, FIG. 5 illustrates the binarization of an absolute difference in accordance with the embodiment of the present invention, and FIG. 6 is a block diagram illustrating the structure of a decoding device in accordance with the embodiment of the present invention.

Referring to FIG. 2, the coding device of the present invention includes a current frame luminance mean calculating unit 210, a reference frame luminance mean calculating unit 220, a motion estimation unit 230, a motion compensated prediction unit 240, an absolute difference calculating unit 245 and a CABAC coding unit 250.

The motion estimation unit 230 includes a current frame pattern blocking unit 231 and a reference frame pattern blocking unit 233, to search the candidate block having the most similar pattern to the current frame among the candidate blocks of the reference frame.

The current frame pattern blocking unit 231 generates the pattern block of the current frame block by subtracting the pixel mean Mcurr of the luminance component of the current frame, calculated by the current frame luminance mean calculating unit 210, from each luminance component of the current frame.

The reference frame pattern blocking unit 233 generates the pattern block of the reference frame block by subtracting the pixel mean Mref of the luminance component of the reference frame, calculated by the current frame luminance mean calculating unit 210, from each luminance component of the reference frame.

At this time, the current frame luminance mean calculating unit 210 inputs the pixel mean Mcurr of the luminance component of the current frame into the absolute difference calculating unit 245, and the reference frame luminance mean calculating unit 220 inputs the pixel mean Mref of the luminance component of the reference frame into the absolute difference calculating unit 245. If the absolute difference calculating unit 245 receives an operation start command from the motion estimation unit 230 (or a motion vector determining unit 235), the absolute difference calculating unit 245 calculates the absolute difference between the Mcurr and the Mref and inputs the calculated absolute difference into the CABAC coding unit 250. If the CABAC coding unit 250 receives the absolute difference from the absolute difference calculating unit 245, the CABAC coding unit 250 codes the received absolute difference by CABAC and inserts the coded absolute difference into the header of the bit stream along with a sign bit of 1 bit to transmit it to a decoder.

In the joint video team (JVT) method, two types of coding processes for syntax element (SE) are defined: context based adaptive variable length coding (CAVLC) and context adaptive binary arithmetic coding (CABAC). Typically, the CABAC compresses the SE with higher efficiency than the CAVLC.

In the CABAC defined in the JVT method, the SE is converted to symbol data by variable length coding (VLC) or invariable length coding. Here, each symbol of the converted symbol data refers to a binary symbol (bin). The CAVAC coding unit 250 of the present invention can use the VLC. FIG. 3 illustrates the binarization coding tree related to the binarization schema in accordance with the embodiment of the present invention, and FIG. 4 illustrates the binarization related to the macro block type of the P slice in accordance with the embodiment of the present invention.

As illustrated in FIG. 3 and FIG. 4, the present invention transforms and applies the binarization of the macro block type of the P slice defined in the H.264. In other words, '31(P_L0__16×16_Mean)' is newly designed for the size of a 16×16 macro block. This is to transmit CABAC-coded absolute difference to a pertinent coder in case that the 16×16 macro block using a new-designed NewSAD formula has a minimum size, among absolute differences using the NewSAD formula and the conventional SAD formula, described below.

In the coding process, the bin is inputted and the arithmetic coding (AC) is performed. Then, an output bit is determined based on the processed result and outputted in the bit stream. The CABAC coding unit 250 of the present invention performs the corresponding coding by using the binarization of the absolute difference illustrated in FIG. 5. Since the CAVAC coding method is well-known to those of ordinary skill in the art, the pertinent description will be omitted. However, a few examples will be described for the convenience of understanding.

For example, if the inputted absolute difference is 4, the positive bit value '1' is firstly outputted. Then, the CAVAC coding method performs the CABAC coding b0b1b2 of the macro block type in the P slice for '001' Then, when it is assumed that the probability is 0.5, the CAVAC coding method performs the bypass coding of the '11010' (refer to FIG. 5) corresponding to 4.

However, if the inputted absolute difference is −4, the negative bit value '0' is firstly outputted. Then, the CAVAC coding method performs the CABAC coding b0b1b2 of the macro block type in the P slice for '001.' Then, when it is assumed that the probability is 0.5, the CAVAC coding method performs the bypass coding of the '11010' (refer to FIG. 5) corresponding to 4.

Again, referring to FIG. 2, the motion estimation unit 230 further includes a motion vector determining unit 235 for determining a final motion vector.

If the entire pattern blocks of the current frame block and the reference frame block are completed, the motion vector determining unit 235 calculates the SAD of each pattern block and determines the final macro block mode and/or the motion vector and determines the final macro block mode and/or the motion vector.

Here, the motion vector determining unit 235 calculates the SAD for 0, 1, 2, 3, 4, 5 to 30 (refer to FIG. 4) of the macro block type of the P slice by a conventional method (refer to formula 1, described below) and the SAD for the newly added 31 of the macro block type of the P slice by a new method (refer to formula 2, described below). Here, the macro block type 0 and 31 is 16×16 macro blocks, and the macro block type 1 is 16×8 macro block. Also, the macro block type 2 is 8×16 macro block, and the macro block type 3 is 8×8 macro block.

As described above, in the case only of determining the macro block mode as the macro block mode type 31, the CABAC coded absolute difference is transmitted to the pertinent decoder. Otherwise, the corresponding operations are processed in accordance with the conventional method. Accordingly, since the processes by the conventional method is well-known to any person of ordinary skill in the art, FIG. 2 assumes the case that the macro block mode is determined as the macro block mode type 31.

First, the SAD for calculating an optimized macro block mode in accordance with the conventional method is calculated by the following formula 1. The prior art is constructed to determine the candidate block having the smallest SAD as the optimized macro block mode and/or the motion vector.

$$SAD(x, y) = \sum_{i=0}^{S-1} \sum_{j=0}^{T-1} |f(i, j) - r(i+x, j+y)| \quad \text{[Formula 1]}$$

where f(i, j) is the pixel value of the spatial coordinate (i, j) of the current frame, r(i, j) is the pixel value of the spatial coordinate (i, j) of the reference frame and S and T refer to each size of blocks used in a block matching process. Also, in the formula 1, (x,y) refers to the motion vector. The formula 1 can be used for the macro blocks having the sizes of 16×16, 16×8, 8×16, 8×8, 8×4, 4×8, and 4×4.

On the other hand, in order to minimize an error between the current block and the candidate block due to illumination change, the macro block type 31 uses the following formula 2 to extract an object type, which is not affected by the illumination change, that is, a pattern. In other words, the pattern block is generated by subtracting the average value, calculated from each block, from each block.

$$NewSAD(x, y) = \sum_{i=0}^{15} \sum_{j=0}^{15} |[f(i, j] - M_{curr}] - [r(i+x, j+y) - M_{ref}]| \quad \text{[Formula 2]}$$

where Mcurr refers to the pixel mean of the current block, and Mref refers to the pixel mean of the candidate block of the reference frame. For example, U and V, respectively, are set as 16.

The motion vector determining unit 235 determines the final macro block mode and/or the motion vector as the macro block type having the smallest SAD among the SADs for 0, 1, 2, 3, 4, 5 to 30 (refer to FIG. 4) of the macro block type of the P slice calculated by the formula 1 and the SAD for the macro block type 31 calculated by the formula 2.

If the macro block mode is determined as the macro block mode type 31, the motion vector determining unit 235 uses the reference block, acquired by the SAD calculating formula calculated by the formula 2, to code the residual signal. The motion compensation can be performed by subtracting each pixel mean of the current block and the reference block from each pixel value of the current block and the reference block as the following formula 3.

$$NewR(i, j) = [f(i, j) - M_{curr}] - [r(i+MV_x, j+MV_y) - M_{ref}] \quad \text{[Formula 3]}$$
$$= f(i, j) - r(i+MV_x, j+MV_y) - M_{curr} + M_{ref}$$

where NewR refers to the residual signal subtracting each pixel mean. As such, the mean of the residual signal is adjusted close to zero by the subtraction of the mean of each block, to thereby increase the compressing rate, which is decreased due to the illumination change.

The residual signal NewR becomes a coded residual signal NewR' through the DCT and the quantization, and the coding process is finally completed through the entropy coding.

FIG. 6 is a block diagram illustrating the structure of a decoding device in accordance with the embodiment of the present invention.

Inversely, in a decoding process, the coded residual signal NewR' becomes a decoded residual signal NewR" through inverse quantization and reverse DCT. Through this, the reconstruction is performed. However, if the macro block mode is determined as the macro block mode type 31, the absolute difference of the block, which is currently being decoded, is requested to allow a decoder to perform the decoding. Accordingly, information related to the absolute difference of the current block must be added. The inputted coded absolute difference, which is decoded by a CABAC decoding unit 270, is inputted to a motion compensating unit 275 of the decoding device.

The motion compensating unit 275 of the decoding device can perform the decoding of the decoded residual signal NewR" by using the luminance mean calculated in a reference frame luminance mean calculating unit 280 and the absolute difference received in the coding device.

As a result, the decoding process after the inverse quantization and reverse DCT can be represented by the following formula 4.

$$f(i,j) = r(i+MV_x, j+MV_y) + NewR''(i+j) + M_{curr} - M_{ref} \quad \text{[Formula 4]}$$

where f(i, j) is the pixel value of the spatial coordinate (i, j) of the coded current frame, r(i, j) is the pixel value of the spatial coordinate (i, j) of the reference frame and (x,y) refers to the motion vector. In other words, the pixel value of the reference frame considering the motion vector is added to the decoded residual signal NewR". Then, by adding the calculated result to the pixel mean of the current block and subtracting the pixel mean of the candidate block of the reference block from added result, a pertinent pixel value can be calculated in the coordinate (i, j) of the current frame to be decoded.

Here, the adaptive motion estimation method for illumination change can be applied to not only all conventional coding and decoding methods including H.264 but also all coding and decoding methods, which will be developed in the future. In accordance with an embodiment of the present invention, if a predetermined coding method is applied to the present invention, a corresponding coding mode becomes twice as much as a previous coding mode. This is because each coding mode using a pixel mean is generated corresponding to each coding mode in accordance with the previous method. Accordingly, in the case of applying the present invention, the pertinent process can further include a step of displaying an identifier for identifying the coding mode to a flag field.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

Industrial Applicability

As described above, the present invention can more efficiently code and decode an image through adaptive motion estimation and motion compensation for illumination change.

Also, the present invention can minimize the transmission amount of the bit stream transmitted to a decoder for decoding by transforming the binarization of the MB type of the P slice of H.265 a little and attempting to maximize compressing rate applied with various SAD calculating formulas in the case of a 16×16 block for example.

In addition, the present invention can provide a codec that is little affected by a change of surrounding illumination in an actual environment.

The invention claimed is:

1. An adaptive motion estimation method for illumination change, the method comprising:
    generating the current frame pattern block of a current frame block and the reference frame pattern block of a reference frame block;
    calculating the Sum of Absolute Difference (SAD) of candidate pattern blocks corresponding to the current frame pattern block among the reference frame pattern blocks and determining a candidate pattern block corresponding to the SAD that meets to predetermined condition among the calculated SADs as a macro block mode and a motion vector;
    generating a residual signal by using a candidate pattern block corresponding to the motion vector and a different signal of the current frame pattern block, performing the discrete cosine transform (DCT) and the quantization of the residual signal in accordance with a predetermined coding mode, and coding the current frame block; and
    attaching sign information and a coded absolute difference to header information corresponding to the coded current frame block if the macro block mode comprises a 16×16 size,
    whereas the sign information refers to a sign of the difference between the pixel mean of the current frame block and the pixel mean of the reference frame block, and the coded absolute difference refers to the absolute difference between the pixel mean of the current frame block and the pixel mean of the reference frame block.

2. The method of claim 1, wherein the current frame block comprises at least one of 16×16, 16×8, 8×16, 8×8, 8×4, 4×8, and 4×4 size types.

3. The method of claim 1, wherein the step of generating the current frame pattern block of the current frame block and the reference frame pattern block of the reference frame block comprises calculating the luminance component mean of the current frame block and the luminance component mean of the reference frame block; and
    generating the current frame pattern block by subtracting the luminance component mean of the current frame block from the luminance component of the current frame block and generating the reference frame pattern block by subtracting the luminance component mean of the reference frame block from the luminance component of the reference frame block.

4. The method of claim 1, wherein the absolute difference is coded by a context adaptive binary arithmetic coding (CABAC) method, a corresponding size is represented by binary coding symbol (ABS), and the size is coded by the 0 th power of exp-golomb code (EGC).

5. The method of claim 1, wherein the sign information is represented by 1-bit sign.

6. The method of claim 1, wherein in the step of calculating the SAD of the candidate pattern blocks and determining the candidate pattern block as a macro block mode and a motion vector, the candidate pattern block comprises 16×16, 16×8, 8×16 and 8×8 size types, each SAD for all candidate pattern blocks is calculated by the formula 1 of $$SAD(x, y) = \sum_{i=0}^{S-1} \sum_{j=0}^{T-1} |f(i, j) - r(i+x, j+y)|,$$

and the SAD for the candidate pattern block having the 16×16 size type is further calculated by the formula 2 of $$NewSAD(x, y) = \sum_{i=0}^{15} \sum_{j=0}^{15} |[f(i, j) - M_{curr}] - [r(i+x, j+y) - M_{ref}]|,$$

where f(i, j) is the pixel value of the spatial coordinate (i, j) of the current frame, r(i+x,j+y) is the pixel value of the spatial coordinate (i+x, j+y) of the reference frame, S and T refer to each size of blocks used in a block matching process, (x,y) refers to the motion vector, Mcurr refers to the pixel mean of the current block, and Mref refers to the pixel mean of the candidate block of the reference frame.

7. The method of claim 6, wherein the step of attaching the sign information and coded absolute difference to the header information corresponding to the coded current frame block is performed if the SAD calculated by the formula 2 is the minimum SAD.

8. The method of claim 1, wherein the residual signal is calculated by the following formula:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR refers to the residual signal subtracting each pixel mean, Mcurr refers to the pixel mean of the current block, Mref refers to the pixel mean of the candidate block of the reference frame, f(i, j) is the pixel value of the spatial coordinate (i, j) of the current frame, r(i, j) is the pixel value of the spatial coordinate (i, j) of the reference frame and (x,y) refers to the motion vector.

9. An adaptive motion estimation device for illumination change, the device comprising:
    a pattern block generating unit, generating the current frame pattern block of a current frame block and the reference frame pattern block of a reference frame block;

a motion vector determining unit, calculating the Sum of Absolute Difference (SAD) of candidate pattern blocks corresponding to the current frame pattern block among the reference frame pattern blocks and determining a candidate pattern block corresponding to the SAD that meets to predetermined condition among the calculated SADs as a macro block mode and a motion vector;

a motion compensation unit, generating a residual signal by using a candidate pattern block corresponding to the motion vector and a different signal of the current frame pattern block, performing the discrete cosine transform (DCT) and the quantization of the residual signal in accordance with a predetermined coding mode, and coding the current frame block; and a header information attaching unit, attaching sign information and a coded absolute difference to header information corresponding to the coded current frame block if the macro block mode comprises a 16×16 size, whereas the sign information refers to a sign of the difference between the pixel mean of the current frame block and the pixel mean of the reference frame block, and the coded absolute difference refers to the absolute difference between the pixel mean of the current frame block and the pixel mean of the reference frame block.

10. The device of claim 9, wherein the absolute difference is coded by a context adaptive binary arithmetic coding (CABAC) method, a corresponding size is represented by binary coding symbol (ABS), and the size is coded by the 0 th power of exp-golomb code (EGC).

11. The device of claim 9, wherein the sign information is represented by 1-bit sign.

12. The device of claim 9, wherein the pattern block generating unit calculates the luminance component mean of the current frame block and the luminance component mean of the reference frame block, generates the current frame pattern block by subtracting the luminance component mean of the current frame block from the luminance component of the current frame block and generates the reference frame pattern block by subtracting the luminance component mean of the reference frame block from the luminance component of the reference frame block.

13. The device of claim 9, further comprising means performing the discrete cosine transform and the quantization of the residual signal.

14. The device of claim 9, wherein in the step of calculating the SAD of the candidate pattern blocks and determining the candidate pattern block as a macro block mode and a motion vector, the candidate pattern block comprises 16×16, 16×8, 8×16 and 8×8 size types, each SAD for all candidate pattern blocks is calculated by the formula 1 of $$SAD(x, y) = \sum_{i=0}^{S-1}\sum_{j=0}^{T-1} |f(i, j) - r(i+x, j+y)|,$$

and the SAD for the candidate pattern block having the 16×16 size type is further calculated by the formula 2 of $$NewSAD(x, y) = \sum_{i=0}^{15}\sum_{j=0}^{15} |[f(i, j)] - M_{curr}] - [r(i+x, j+y) - M_{ref}]|,$$

where $f(i, j)$ is the pixel value of the spatial coordinate $(i, j)$ of the current frame, $r(i+x, j+y)$ is the pixel value of the spatial coordinate $(i+x, j+y)$ of the reference frame, S and T refer to each size of blocks used in a block matching process, $(x,y)$ refers to the motion vector, Mcurr refers to the pixel mean of the current block, and Mref refers to the pixel mean of the candidate block of the reference frame.

15. The device of claim 9, wherein the residual signal is calculated by the following formula:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR refers to the residual signal subtracting each pixel mean, Mcurr refers to the pixel mean of the current block, Mref refers to the pixel mean of the candidate block of the reference frame, $f(i, j)$ is the pixel value of the spatial coordinate $(i, j)$ of the current frame, $r(i, j)$ is the pixel value of the spatial coordinate $(i, j)$ of the reference frame and $(x,y)$ refers to the motion vector.

* * * * *